L. EASTON.
AGRICULTURAL IMPLEMENT.
APPLICATION FILED OCT. 16, 1915.
1,219,444.
Patented Mar. 20, 1917.
5 SHEETS—SHEET 1.
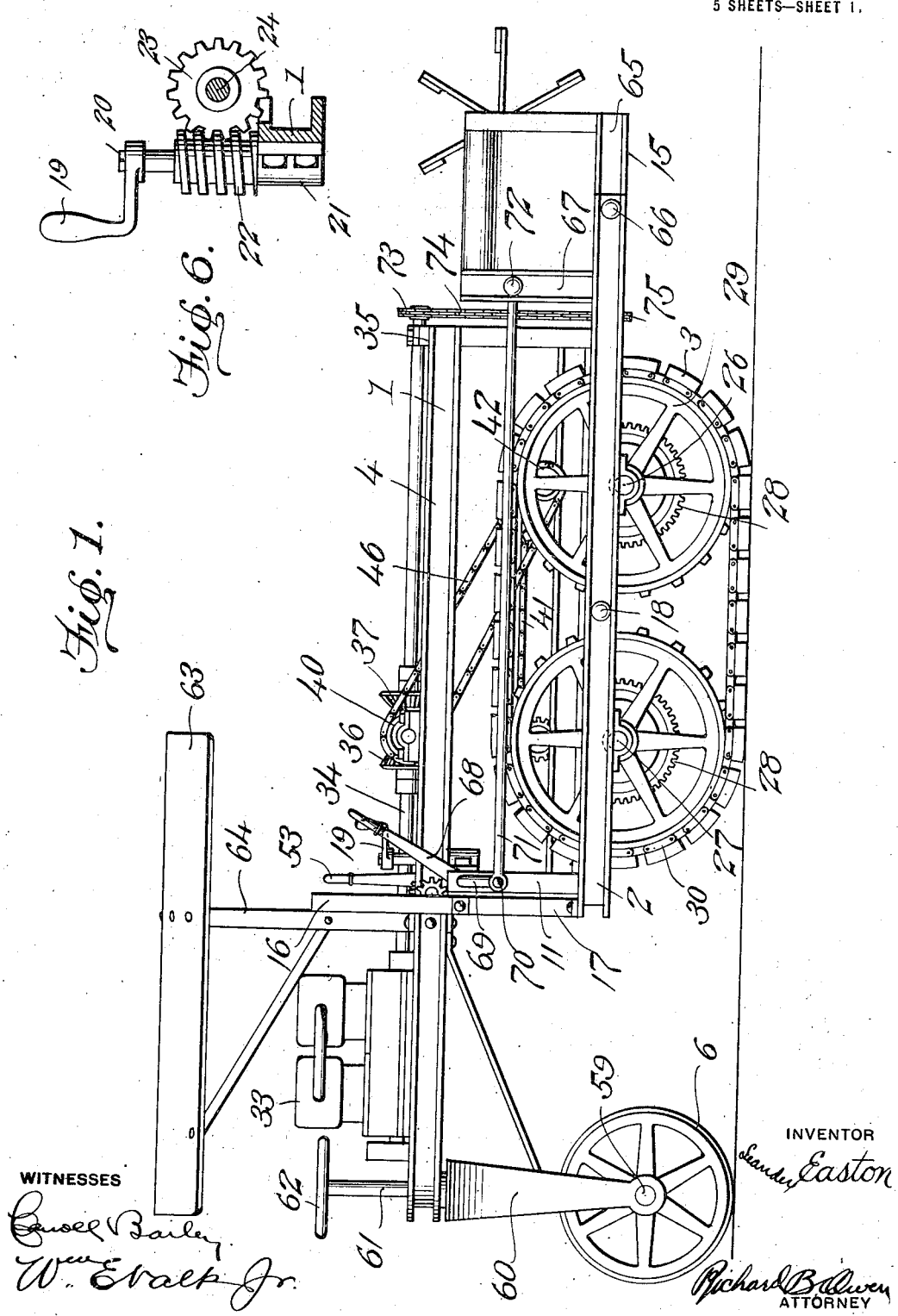

L. EASTON.
AGRICULTURAL IMPLEMENT.
APPLICATION FILED OCT. 16, 1915.
1,219,444.
Patented Mar. 20, 1917.
5 SHEETS—SHEET 2.
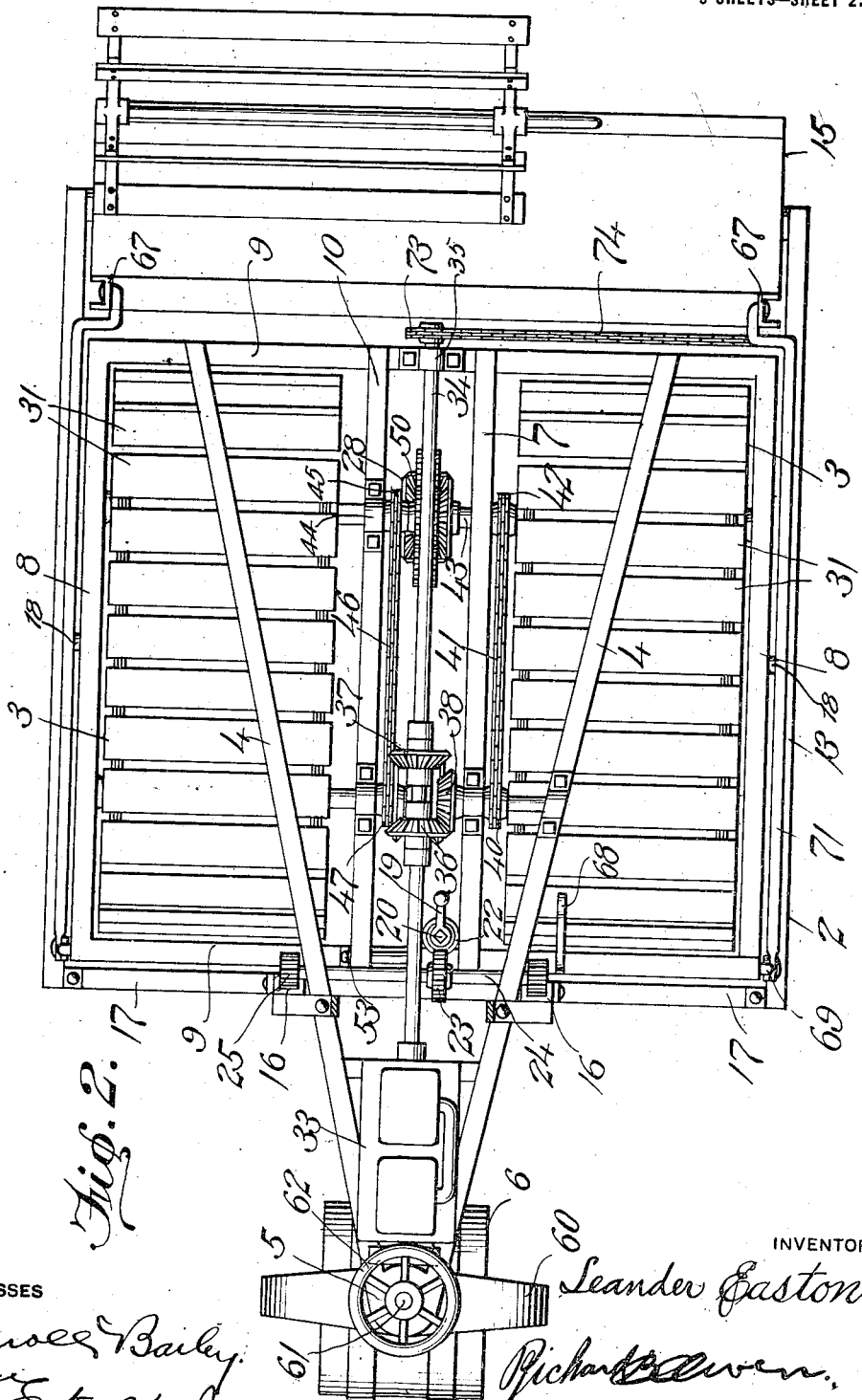

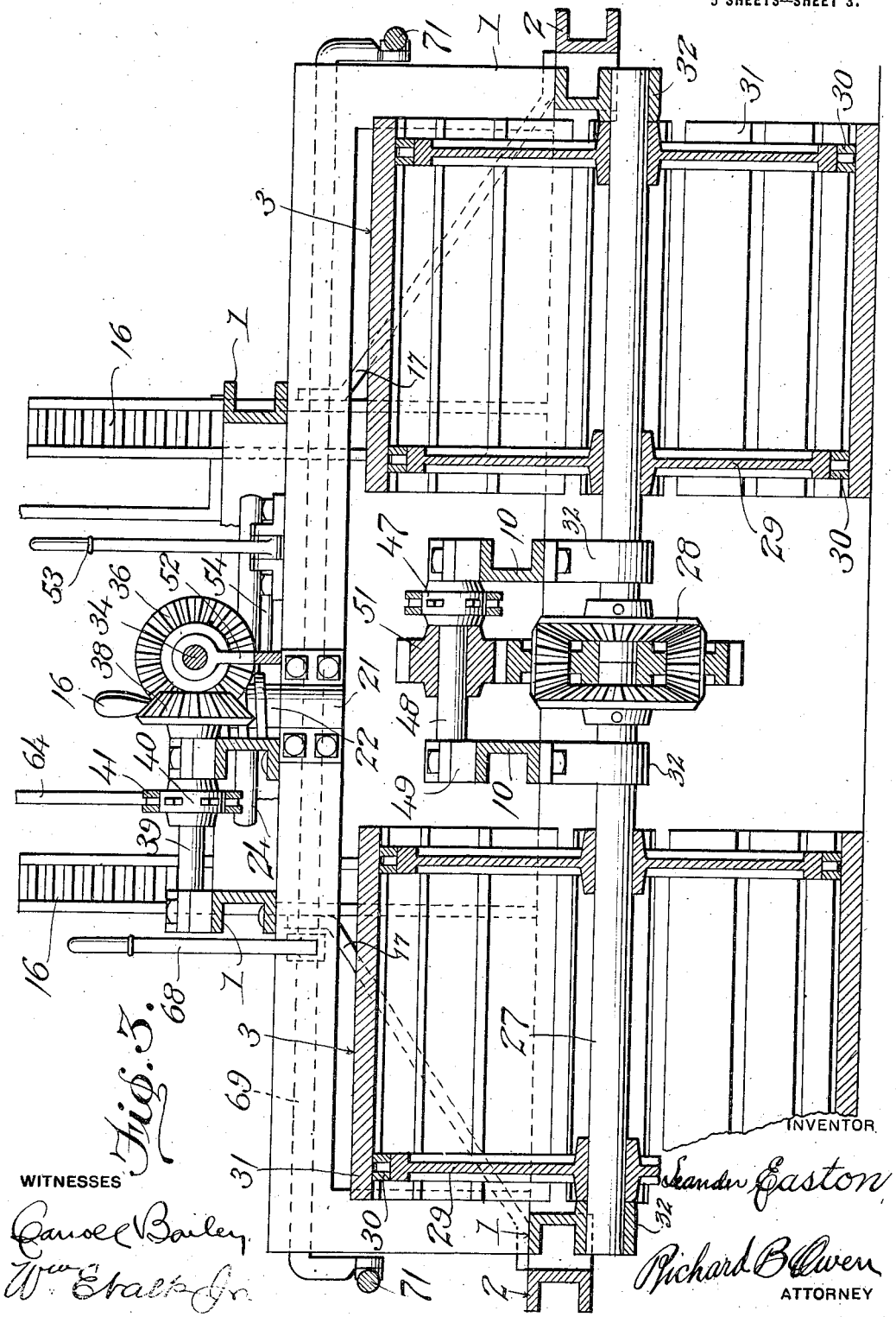

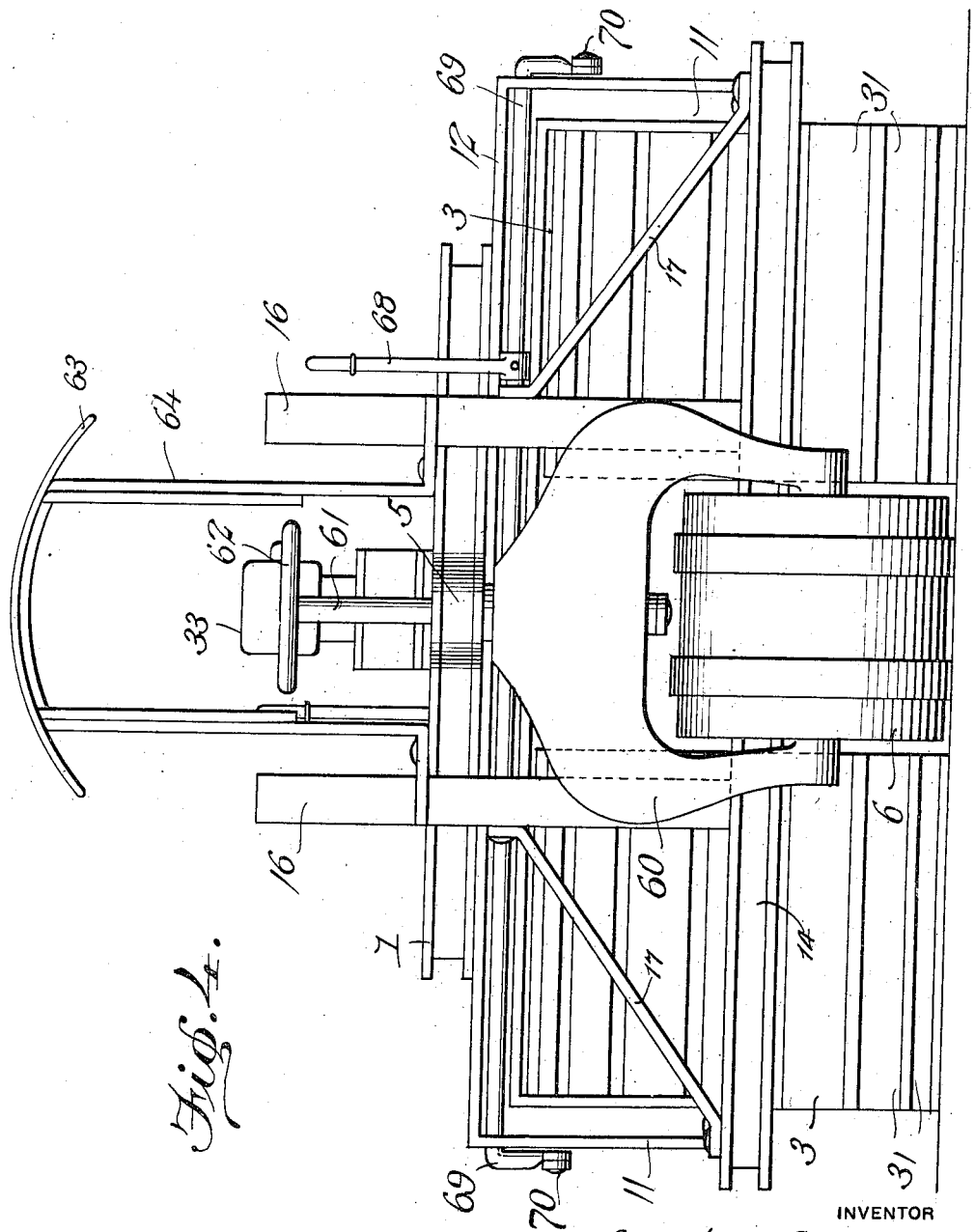

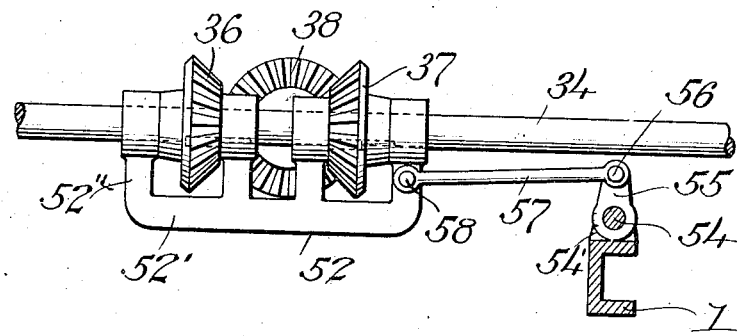
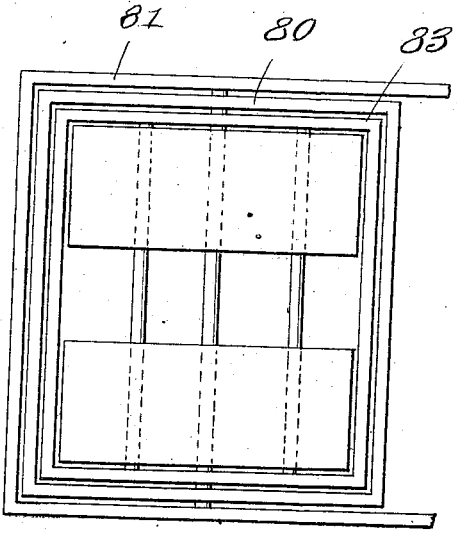

UNITED STATES PATENT OFFICE.

LEANDER EASTON, OF ROSLYN, ILLINOIS.

AGRICULTURAL IMPLEMENT.

1,219,444.

Specification of Letters Patent. Patented Mar. 20, 1917.

Application filed October 16, 1915. Serial No. 56,295.

*To all whom it may concern:*

Be it known that I, LEANDER EASTON, a citizen of the United States, residing at Roslyn, in the county of Cumberland and State of Illinois, have invented certain new and useful Improvements in Agricultural Implements, of which the following is a specification.

My invention relates to agricultural machinery and more particularly to an improved tractor or engine of that type utilizing what is generally known as a "caterpillar tread."

An object of the invention is to provide a traction engine designed particularly for use in well water districts wherein the earth or soil is of such a nature as to preclude effectual use of either draft animals or power appliances of an accepted design.

A further object of the invention is to provide an agricultural machine of a construction permitting attachment thereto of various soil treating and farming implements.

A still further object of the invention is to provide a traction engine of a construction designed primarily for use in connection with a reaper and binder, although, as suggested, various agricultural devices and soil treating implements may be, if desired, operatively associated therewith.

I further contemplate a tractor wherein provision is made for several necessary adjustments to be hereinafter described.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of my improved machine;

Fig. 2 is a top plan view;

Fig. 3 is a transverse or cross sectional view;

Fig. 4 is a rear end view;

Fig. 5 is a detail elevation of the gear shifting device;

Fig. 6 is a detail view of the frame adjusting means; and

Fig. 7 illustrates a modification.

Before proceeding with a description of the drawings I desire to call particular attention to the fact that while I have evolved my invention with reference to its use in connection with a grain reaper and binder, the same, if desired, may be operatively associated with various soil treating implements such as plows, harrows, etc., or with agricultural implements such as mowers, planters, etc., and if desired, as a roller.

Referring now to the drawings by numerals, 1 designates as an entirety the main frame of the machine, 2 as an entirety, the auxiliary or adjustable frame, and 3 as an entirety that portion of the machine constituting the caterpillar tread.

The main frame 1 in its preferred embodiment comprises beams 4—4 disposed in diverging relation and connected at one end as indicated at 5 in such a manner as to properly mount the steering wheel 6. Beams 7, disposed in contiguous relation, with said beams 4, constitute the upper portion of the main frame 1. The lower portion of the said frame 1 comprises longitudinal beams 8—8, end or transverse beams 9—9, and centrally disposed beams 10—10, the latter, beams 10 extending parallel with the beams 7 and in a horizontal plane therebeneath. Standards or upright beams 11—11 afford a support means for the upper portion of the main frame 1 and with the beams 4, 7, 8, 9 and 10 constitute the main frame 1 of the machine.

The auxiliary or adjustable frame 2 is of a size and shape to embrace horizontally the lower portion of the main frame 1, said auxiliary frame comprising longitudinal or auxiliary frame comprising longitudinal or side beams 13 and a rear cross beam 14, the forward end of the auxiliary frame terminating beyond the forward end of the main frame, said beams 13 affording a support for a binder frame 15 hereinafter more particularly described.

Parallel vertical rack bars 16—16 are pivoted to the cross beam 14 of the auxiliary frame, one bar at each side of the respective beams 4. Braces 17—17 have a rigid connection with the beams 16—16 and a pivotal connection with the auxiliary frame that the mentioned bars 16—16 during adjustment of said frame, may at all times maintain a substantially vertical or upright position. Pivot pins 18—18 penetrate the beams 8—8 and the beams 13—13 that the auxiliary frame 2, during adjustment, may be oscillated, to either raise or lower the binder frame 15 relatively to the ground. Adjustment is obtained through manipulation of a crank handle 19 affixed to a vertical stub shaft 20 journaled in a suitable bearing 21 in turn secured to the rear cross beam 12 forming a part of the main frame. A worm 22 is mounted on the shaft 20 to engage with a pinion 23 mounted on a shaft 24 journaled in bearings therefor formed by the beams 4—4. Pinions 25—25 are mounted, one upon each end of the shaft 24 to engage with the rack bars 16—16 hereinbefore described. Through manipulation of the crank handle 19, the desired adjustment of the auxiliary frame 2 is obtained.

Coming now to a description of the caterpillar tread devices, each designated as an entirety by the numeral 3, 26 designates the front axle and 27 the rear axle of the machine. The axles 26 and 27 are both divided as illustrated in Fig. 3 of the drawings, the corresponding sections of each of the mentioned axles affording a support for the devices 3. A bevel gear differential 28 is associated with each axle for an obvious purpose.

The caterpillar tread devices 3 being in duplicate, a description of but one will ensue. As before suggested, the corresponding sections of the axles 26 and 27 together support one of said devices. Each of the mentioned sections has mounted thereon two comparatively large sprockets 29 over which sprockets chains 30—30 ride. Parallel uniformly spaced slats 31 are connected to the respective chains 30—30, the mentioned slats, during rotation of the sprockets providing the caterpillar tread. Through action of differential 28, it is evident that the devices 3 may move at varying speeds.

The sections constituting axles 26 and 27 are journaled in bearings 32 therefor affixed to the side beams 8 and the central beams 10 forming a part of the main frame 1.

The driving power for the caterpillar tread devices 3 is obtained through operation of an engine 33 preferably of the internal combustion type, situated rearwardly of the main frame 1. The power shaft of the engine, designated 34 is journaled in bearings 35 attached to said frame. Gears 36 and 37 are mounted for sliding movement on the shaft 34. A relatively fixed bevel gear 38 is mounted on a stub shaft 39 in proximity to the gears 36 and 37. Shaft 39 carries a sprocket 40 over which a chain 41 is arranged to operate, said chain engaging also a sprocket 42 mounted on a shaft 43 journaled in bearings 44 secured to the beams 10—10. Said shaft 43 also carries a sprocket 45 over which a chain 46 is arranged to operate, the mentioned chain engaging also a sprocket 47 mounted on a shaft 48 journaled in bearings 49 disposed forwardly of the beams 10. Shaft 43 is in parallelism with the forward axle 26 and disposed directly thereabove while shaft 48 is in parallelism with the rear axle 27 being disposed directly thereabove. Shaft 43 carries a gear 50 which is adapted to mesh with the differential 28 of the said forward axle and shaft 48 a gear 51 which is adapted to mesh with the differential 28 of the rear axle. Through the above arrangement power is transmitted from the engine or power shaft 34 to the caterpillar tread devices.

Proceeding now to the reverse gears 36 and 37, attention is directed to the fact that the mentioned gears are of the opposed bevel type. A bracket 52 is mounted for sliding movement on the shaft 34, said bracket comprising a main or body portion 52' and arms 52", the latter directly engaging said shaft and said chain speed gears. Movements of the bracket 52 toward the front end of the machine will bring gear 36 into driving engagement with the gear 38 and movement of said bracket toward the rear end of the machine will bring gear 37 into driving engagement with said gear 38. The action of the gear 36 is to advance the machine and of gear 37, the opposite. Movement of the bracket 52 is obtained through manipulation of a lever 53 connected to a rod 54 journaled in bearings 54' affixed to the main frame. Said rod 54 carries a link 55 pivoted as at 56 to a rod 57 which is in turn pivoted as at 58 to said bracket.

The steering wheel 6, as before intimated, is mounted at the rear end of the machine. Said wheel 6 is provided with a relatively broad tread and mounted on an axle 59 journaled in arms forming a part of a wheel support 60. A shaft 61 is attached to said shaft 60, said shaft penetrating that portion of the main frame designated 5. A steering wheel 62 is mounted on the shaft 61 that movement of the wheel support 60 and the wheel 6 may be varied as desired. A canopy or shield 63 supported by uprights or standards 64 is positioned over the rear end of the machine to protect not only the engine 33 but the engine attendant or the machine operator. Crank 19 and lever 53 are disposed in proximity to the engine.

Proceeding now with a description of the binder frame 15, 65 designates the frame proper which is pivoted as at 66 between the beams 13 forming a part of the auxiliary frame 2. Uprights 67—67 are made fast to the frame 65, one at each end thereof. Adjustment of the said frame 65 relatively to the auxiliary frame 2 is obtained through manipulation of a lever 68 fastened to a crank shaft 69 journaled in the main frame 1. The terminals of the shaft 69 are connected as at 70 to rods 71 which are in turn connected as at 72 to the respective uprights 67. A rod 71 is positioned at each side of the machine that adjustment of the frame 65 may be uniform and true.

Through adjustment of the frame 65, independently of the auxiliary frame or through adjustment of said auxiliary frame, it is evident that the reaper and binder attachment (only suggested but not shown) may be moved into and out of the desired proximity to the ground. The power necessary to operation of the binder and reaper attachment is derived through the shaft 34, a sprocket 73 being mounted on said shaft over which a chain 74 is arranged, said chain engaging a sprocket 75 forming a part of the power means utilized to operate the attachment.

From the foregoing, taken in connection with the accompanying drawings it is evident that the tractor may be utilized for any of the various purposes before pointed out; that adjustment of the frame 65 may be obtained through manipulation of either the crank 19 or the lever 68; and that through the medium of caterpillar tread devices, the tractor may be operated upon boggy or marshy soil.

Referring now to the modification illustrated in Fig. 7, 80 designates the frame corresponding to the frame 1 of the preferred form, 81 the frame corresponding to the frame 2 of the preferred form, and 83 a third frame for the caterpillar tread devices, the said third frame being pivoted as at 84 within the main frame 80 to mount said devices in a manner permitting bodily pivotal movement, this arrangement permitting proper operation of the machine when operating upon uneven or broken ground.

In reduction to practice, I have found that the form of my invention, illustrated in the drawings and referred to in the above description, as the preferred embodiment, is the most efficient and practical; yet realizing that the conditons concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a tractor, a main frame, rolling means supporting said frame, an auxiliary frame pivoted for movement relatively to said main frame, a means to adjust and lock said auxiliary frame in its adjusted position, an agricultural implement carried by said auxiliary frame, and means on the main frame to drive the said rolling means.

2. In a tractor, the combination with an agricultural implement, of an implement supporting frame pivoted to move relatively to said tractor, a means to adjust and lock said frame in its adjusted position, a third frame pivoted to said last mentioned frame and supporting said implement, and a means on the tractor engaging the third frame to permit of adjustment thereof substantially as described.

3. In a tractor, a main frame, caterpillar tread devices supporting said frame, collar means on said frame for driving said devices, differential mechanism associated with said devices, and a steering mechanism for said frame.

4. A means for operatively associating an agricultural implement with a tractor including in combination with said tractor, an auxiliary supporting frame pivoted for movement relatively to the tractor, an implement supporting frame pivoted to said auxiliary frame, a means on the tractor engaging the said auxiliary frame to adjust and lock said frame in its adjusted position, and a means on the tractor engaging the implement supporting frame to lock and adjust said frame in its adjusted position.

5. A means for operatively associating an agricultural implement with a tractor including in combination with the tractor, an auxiliary supporting frame attached to and adjustable upon said tractor, vertical rack bars pivoted to said auxiliary frame, means carried by the tractor to engage the rack bars for adjusting said auxiliary frame and locking said frame in its adjusted position, an implement supporting frame pivoted for movement independently of said auxiliary frame, and a means on the tractor engaging with said supporting frame to adjust and lock said frame in its adjusted position, and a power means for the tractor operatively associated with the implement mounted on said implement supporting frame.

6. In a tractor, a machine frame, a pair of caterpillar tread devices each having a forward and a rearward axle, differentials connecting corresponding axles of the devices, a gear for operating each differential, a sprocket and chain mechanism connecting said gears for rotation in unison, a longitudial power shaft, reversing gears on said shaft, a transmission gear engageable by either of said reversing gears, and a chain and sprocket mechanism for driving one of the differential operating gears from said transmission gear.

In testimony whereof I affix my signature in presence of two witnesses.

LEANDER EASTON.

Witnesses:
PHILIP MEYER,
J. A. DECKER.